Patented Dec. 19, 1950

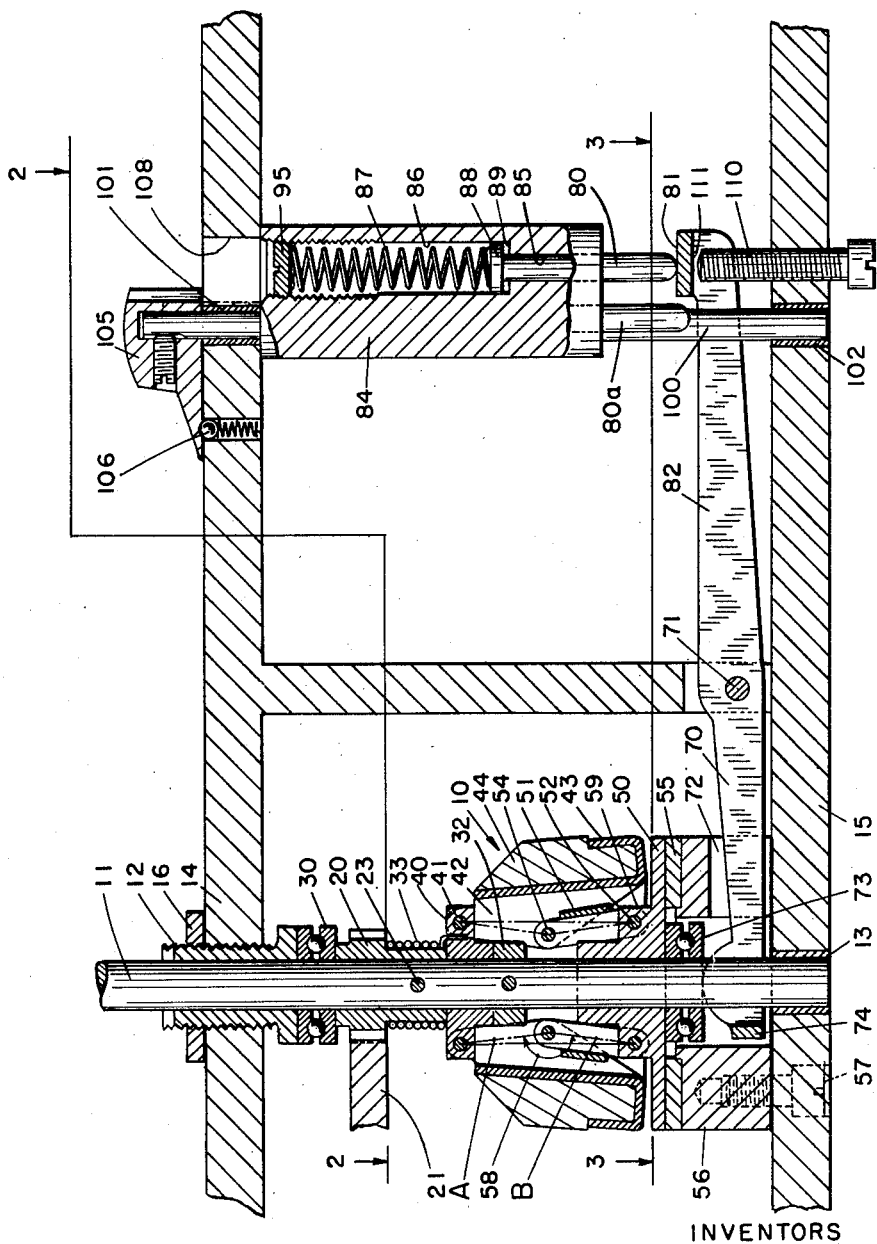

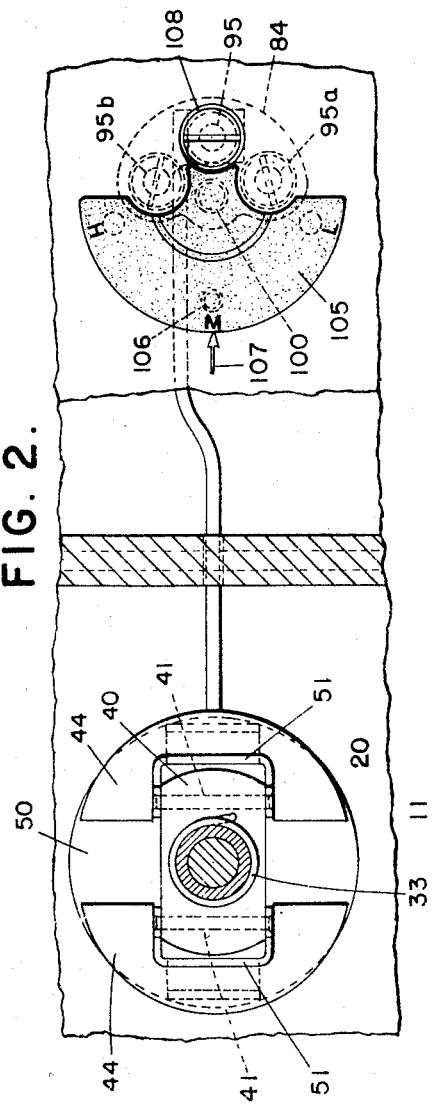
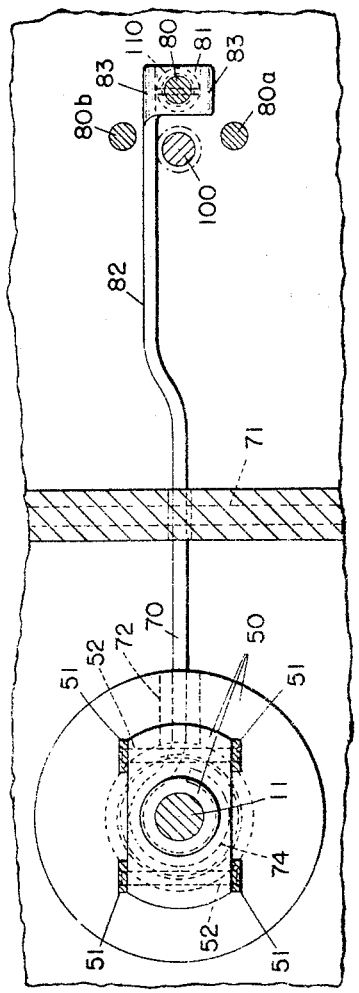
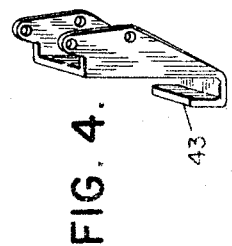
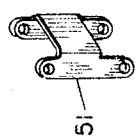

2,534,430

UNITED STATES PATENT OFFICE 2,534,430

SPEED CONTROL

Henry N. Fairbanks, Beverly Hills, and Victor H. Eisler, Hollywood, Calif., assignors to Mitchell Camera Corporation, West Hollywood, Calif., a corporation of Delaware Application March 9, 1946, Serial No. 653,410

16 Claims. (Cl. 188—187)

This invention is concerned with an improved centrifugal type speed control or governor, suitable for a wide variety of applications. It is particularly well adapted for regulating the speed of mechanisms, such as motion picture cameras, in which both weight and space are at a premium and yet the accuracy of regulation must be extremely high.

An important object of our invention is to permit a large mechanical advantage between the radial centrifugal force of the pivoted weights and the resulting axial force urging the braking elements into contact. This increases the effective value of the latter force, and hence of the yieldable opposing force which leads to a given governor speed. The result of increasing these two opposing speed determining forces is to reduce the relative importance of such disturbing forces as friction and gravity, which may change with the orientation of the device. A very high mechanical advantage can be obtained according to our invention without tending to increase the starting friction of the device. Moreover, this mechanical advantage is essentially independent of the speed setting of the governor, permitting operation under the most favorable conditions at all speeds. There is a slight increase of mechanical advantage with increasing force between the brake face and its shoe. For this reason the increase in speed which results from a given increase in driving torque is relatively small, leading to more stable control over a wide range of conditions. Our invention also leads to certain simplifications of design, and is particularly well adapted to accurate and sturdy construction. When the governor is designed according to our invention, the speed of the controlled mechanism can be chosen from among a number of definite values, each of which is determined by a separate, individually adjustable spring. By facilitating the use of relatively long and soft springs our invention increases the speed stability of the governor. Our invention also includes convenient and compact means for shifting from one speed to another, while retaining full accuracy and adjustability of each speed.

Other objects and advantages of our invention and a clear understanding of its nature will become apparent from the following detailed description of a preferred and illustrative embodiment, this particular embodiment being intended for use in a motion picture camera. For this description reference is made to the accompanying drawings of which:

Fig. 1 is an axial section of the illustrative embodiment of our invention;

Fig. 2 is a transverse section on the line 2—2 of Fig. 1;

Fig. 3 is a transverse section on the line 3—3 of Fig. 1;

Fig. 4 is a perspective sketch of the upper weight supporting link of the centrifugal toggle linkage; and Fig. 5 is a perspective sketch of the lower link of this linkage.

Referring now particularly to Fig. 1, the centrifugally reacting assembly of our speed control, indicated at 10, is rotatably mounted on shaft 11. This shaft is journalled in the bearings 12 and 13 which are mounted respectively in upper and lower plates 14 and 15 of the camera case. (The mechanism is shown and will be described as in a vertical position, but that position is not necessary.) For axial adjustment the upper bearing 12 is threaded into plate 14 and provided with lock nut 16. The function of this adjustment will be explained later. Shaft 11 is driven in any suitable way by the mechanism whose speed it is desired to regulate. In Fig. 1 a driving gear 21 is indicated in mesh with the pinion 20 which is pinned at 23 to shaft 11. The ball thrust bearing 30 lies between pinion 20 and the upper shaft bearing 12, limiting the upward axial motion of the pinion.

The revolving centrifugal unit 10 embraces the driving and thrust block 40 and the brake disk 50. Thrust block 40 is rotatably mounted on shaft 11, but is restrained axially on the shaft by gear 20 above and collar 32 below. It is driven from gear 20 by the over-riding spring clutch 33. This gives a positive drive in the forward direction, but permits block 40 and its associated mechanism to continue their rotation momentarily when the driving pinion stops. Any tendency of spring 33 to force block 40 downward on the shaft is counteracted by collar 32. Brake disk 50 is both rotatable and slidable on shaft 11. Block 40 and brake disk 50 are joined by a toggle linkage composed of the upper links 42 and the lower links 51. Two sets of the links are shown; any suitable number may be used. Links 42 are pivoted to block 40 at 41, and are shaped as indicated in Fig. 4 with the U-shaped extensions 43 upon which are mounted the lead governor weights 44. Lower links 51, shown in perspective in Fig. 5, are pivoted to brake disk 50 at 52 and to upper weight supporting links 42 at 54. Centrifugal force acting radially on weights 44 tends to rotate links 42 around pivots 41 in such a direction as to move pivots 54 away from shaft 11. Pivots 54, the central pivots of the toggle action, are located somewhat inside the line connecting upper and lower pivots 41 and 52. The centrifugal force therefore tends to separate pivots 41 and 52, thus urging apart block 40 and brake disk 50. Since block 40 is prevented from moving upward, this has the result of sliding brake disk 50 downward, pressing its lower face against the annular brake shoe 55. This is rigidly mounted by means of the supporting block 56 and screws 57 upon lower plate 15 of the camera case.

The downward motion of brake disk 50 against shoe 55 is opposed by a thrust pressure acting through control lever 70. This is pivoted to the camera case at 71, its left arm, as shown in Fig. 1, extending through opening 72 in block 56 and contacting the lower surface of thrust bearing 73 by means of the yoke 74. If the upward thrust of arm 70, acting through thrust bearing 73 upon brake disk 50, exceeds the downward force upon this disk exerted by the toggle linkage as a result of centrifugal force of weights 44, then disk 50 is lifted free of brake shoe 55, and rotation of shaft 11 is unrestrained by the governor. On the other hand, if the speed of rotation of weights 44 is sufficiently great so that the downward force on disk 50 exceeds the opposite force exerted by arm 70, then brake disk 50 and shoe 55 will be pressed into contact with a force which is equal to the difference of the two opposing forces mentioned. The resultant braking torque upon disk 50 is transmitted by links 51 and 42 to block 40 and thence by clutch spring 33 to pinion 20. The braking torque thus acts to slow the rotation of pinion 20 and the mechanism connected to it until equilibrium is established between the braking torque and the driving torque. The speed at which such equilibrium is reached depends directly upon the upward thrust exerted by control lever 70, assuming any given setting of thrust bearing 30 which sets the position of block 40 and therefore the angles at which linkage 42, 51 effectively operates.

Accurate control of the upward thrust against thrust bearing 73 can be obtained in a number of ways. The means employed in the illustrative embodiment of our invention shown in Figs. 1 to 3 have novel advantages in both accuracy and convenience. As indicated in Fig. 1, the upward thrust exerted by the left-hand arm of pivoted lever 70 is caused by the downward thrust exerted by pin 80 upon surface 81 of the right-hand arm 82 of the lever. Pin 80 is slidingly mounted in hole 85 in the barrel 84, and is urged downward by coil spring 87, housed in chamber 86 coaxially with the pin. Head 88 of pin 80 limits the downward motion of the pin by contacting shoulder 89 at the lower end of chamber 86, and also provides a seat for the lower end of spring 87. The upper end of spring 87 seats against the screw 95 which is threaded directly into the wall of chamber 86, thus providing a convenient means of adjusting the pressure exerted by spring 87 upon pin 80. This adjustment permits the downward thrust of pin 80 upon surface 81 to be accurately controlled, thus determining the upward thrust upon governor brake disk 50 and the resulting speed of the governor. Our invention permits the use of thrust springs of sufficient length so that the resulting thrust is relatively independent of the exact position of the brake elements, thus increasing the accuracy of control.

Barrel 84, in which the pin assembly is mounted, is itself rigidly mounted upon shaft 100 which is journalled in the bearings 101 and 102 in the upper and lower plates 14 and 15 respectively of the camera case. Barrel 84 carries additional pins 80a and 80b, together with thrust controlling spring assemblies similar to that associated with pin 80. Each pin assembly can be separately adjusted to give a particular operating speed of the governor. All these pin assemblies, the number of which is arbitrary, are so oriented in barrel 84 with respect to each other and to shaft 100 that rotation of the barrel about the axis of shaft 100 brings the various pins 80, 80a, etc. successively into the operating position in which pin 80 is shown in Figs. 1 and 3. The axes of the three pins used in the particular embodiment illustrated are parallel to each other and to the axis of shaft 100. Selection of the particular pin assembly to give the desired speed, and its transfer to operating position are accomplished by manual rotation of shaft 100, and hence of the entire barrel assembly. This is facilitated by the knob 105, secured to the upper end of shaft 100. As each pin is moved into operating position its lower end rides up onto lever surface 81 with the help of the rounded or bevelled edges of this surface, indicated in Fig. 3. The various operating positions of barrel 84 are temporarily maintained by ball detent 106, which is shown as acting on knob 105, but might also be made to act either on shaft 100 or on the barrel directly. The governor speeds corresponding to each barrel position can be indicated with the help of the arrow 107, shown in Fig. 2. An opening 108 is provided in the upper plate 14 in such a position as to allow convenient access to the adjusting screw 95 of the particular pin assembly which is in the operating position. The thrust spring 87 of each pin assembly can then readily be adjusted under actual operating conditions to give the desired governor speed. It will be obvious that springs of different strengths or of different lengths can be used in the various pin assemblies, extending the range of speeds available without sacrificing sensitivity of the screw adjustment of each individual speed. After all the springs have been thus adjusted the speed of the governor can be changed from one of the selected speeds to another by simply rotating knob 105 to the corresponding positions, as indicated on its circumference. Such a change of speed cannot effect in any way the adjustment of the screws 95, by which the accuracy of each individual speed is determined.

A lower stop for the right-hand end of lever 70 is provided by the adjustable screw 110, which is shown as threaded directly in lower plate 15. When the governor unit is stationary or is operating below speed, stop 110 takes the thrust of pin 80, so that this is not transmitted to thrust bearing 73 and through the toggle linkage and pinion to upper thrust bearing 30. This reduces the starting friction of the two thrust bearings 73 and 30, and facilitates rapid acceleration of the governor unit.

The mechanical advantage with which the radial centrifugal force of governor weights 44 is translated by the toggle linkage into an axial thrust upon brake disk 50 is determined by the angle between the toggle links 42 and 51. More exactly, this is the angle, indicated at 58, between the line A connecting pivots 41 and 54 of link 42 and the line B connecting pivots 54 and 52 of link 51. That angle is always less than 180°; that is, pivot 54 always lies inward of a line connecting pivots 41 and 52. The more closely that angle approaches 180°, the greater the mechanical advantage. A large mechanical advantage is clearly desirable since a given centrifugal force then leads to relatively large values of the downward thrust upon brake disk 50 and of the balancing upward thrust exerted through arm 70 by the controlling spring 87. The larger these forces, the more nearly negligible are such disturbing forces as friction and the action of gravity upon governor weights 44 or upon any other parts whose weight is or may be placed on block 40 when the mechanism is in a vertical position. If desired, the weight of the latter parts can be prevented from affecting the braking thrust on brake disk 50 by thrust supporting shaft 11 in such a way as to preload thrust bearing 30.

The value of the toggle angle 58 is determined by the axial separation of block 40 and brake disk 50. During operation of the governor the lower face of brake disk 50 is in frictional contact with the upper face of the rigidly mounted brake shoe 55, so that its axial position is very closely determined; and block 40 is urged upward during operation by the toggle linkage, its axial position being determined by thrust bearing 30. Thus the toggle angle 58 is determined in practice by the axial separation of thrust bearing 30 and brake shoe 55. This distance is made adjustable in the present embodiment by the screw adjustment of journal 12 against which bearing 30 rests. Axial adjustment of brake shoe 55 would serve the same purpose. If bearing 12 is adjusted upward, the angle 58 during operation is brought closer to 180°, and the mechanical advantage referred to above is thus increased. An important advantage of our invention is that in practice the difference between angle 58 and 180° can conveniently be made very small.

When the governor unit is stationary, or is operating below speed, thrust spring 87 acting through pin 80 presses the right end of lever 70 downward, lifting brake disk 50 free of shoe 55. Further motion of lever 70 is prevented by stop 110, as described above, the amount of motion allowed being determined by the adjustable clearance between lever and stop, indicated at 111. This action compresses the toggle linkage 42, 51, moving pivots 54 inward toward shaft 11. It is noteworthy that the freedom of the toggle linkage to be thus deformed, completely releasing the brake 50, 55, depends only upon mechanical clearances (such as that between the lower end of link 42 and shoulder 59 of brake disk 50), and is not limited by the above described adjustment of the toggle angle 58. The fineness of this adjustment and the resulting magnitude of the mechanical advantage are therefore limited only by the requirement that the setting be stable in operation. This will automatically satisfy the obvious requirement that block 40 and brake disk 50 be so restrained that pivots 54 of the toggle linkage are held under all conditions inside the lines connecting pivots 41 and 52.

Under all operating conditions the axial positions of block 40 and brake disk 50 are essentially constant, so that once the toggle angle 58 is set to give the most favorable value of the mechanical advantage, this value applies for all speed settings of the governor. The only significant factors affecting the toggle angle during operation are the elastic deformation of the mechanical parts under varying centrifugal loads and the slight axial movement of brake disk 50 which is necessary to vary the braking torque between whatever limits are required. Both of these factors tend to increase the mechanical advantage of the linkage as the braking torque increases. This has the advantage of reducing the effect upon the governor speed caused by a given change in the driving torque. An increase in speed increases not only the centrifugal force exerted by weights 44, but also the mechanical advantage by which it is multiplied. Thus the braking torque, increasing with both these factors, is relatively sensitive to speed, and balances the increased driving torque with a relatively small change of speed.

We claim:

1. A speed control mechanism, embodying a pair of members mounted for rotation about an axis and for relative movement toward and from each other along the axis, means limiting the movement of one of said members axially in a direction away from the other, a weighted linkage interconnecting the two members and comprising two interpivoted links whose outer ends are pivoted respectively to the two members, the interpivot of the two links lying radially within a line joining the two end pivots so that outward swinging movement of the links tends to move the other of said members axially away from the limited-movement member, a friction surface associated with said other member for rotation and axial movement therewith and facing outwardly away from the limited-movement member, and an inwardly facing and relatively fixed friction surface arranged to be contacted by the rotating friction surface upon outward movement thereof, said fixed friction surface being arranged to limit the outward movement of the movable friction surface and its associated member to a position in which the linkage pivots bear the stated relation to each other, means for adjustably setting the movement limiting means of the limited-movement member to adjustably set the axial spacing between the limited-movement member and the relatively fixed friction surface so as to adjust the interlink angle at which the rotating friction surface moves axially into contact with the fixed friction surface, and yielding means for applying a predetermined pressure to the axially movable member tending to force it and its associated friction surface toward the limited-movement member and away from the fixed friction surface, said means including a plurality of springs and means for independently setting the pressure exerted by each of the springs, and shiftable mounting means for the several springs whereby their pressures may be selectively applied to the axially movable member.

2. A speed control mechanism, embodying a pair of members mounted for rotation about an axis and for relative movement toward and from each other along the axis, means limiting the movement of one of said members axially in a direction away from the other, a weighted linkage interconnecting the two members and comprising two interpivoted links whose outer ends are pivoted respectively to the two members, the interpivot of the two links lying radially within a line joining the two end pivots so that outward swinging movement of the links tends to move the other of said members axially away from the limited-movement member, a friction surface associated with said other member for rotation and axial movement therewith and facing outwardly away from the limited-movement member, and an inwardly facing and relatively fixed friction surface arranged to be contacted by the rotating friction surface upon outward movement thereof, said fixed friction surface being arranged to limit the outward movement of the movable friction surface and its associated member to a position in which the linkage pivots bear the stated relation to each other, means for adjustably setting the movement limiting means of the limited-movement member to adjustably set the axial spacing between the limited-movement member and the relatively fixed friction surface so as to adjust the interlink angle at which the rotating friction surface moves axially into contact with the fixed friction surface, yielding means for applying a predetermined pressure to the axially movable member tending to force it and its associated friction surface toward the limited-movement member and away from the fixed friction surface, said means including a pivoted lever with one end in pressure transmitting relation to the axially movable member, a plurality of springs and means for independently setting the pressure exerted by each of the springs, and shiftable mounting means for the several springs whereby their pressures may be selectively applied to the lever.

3. A speed control mechanism, embodying a pair of members mounted for rotation about an axis and for relative movement toward and from each other along the axis, means limiting the movement of one of said members axially away from the other, a weighted linkage interconnecting the two members and comprising two interpivoted links whose outer ends are pivoted respectively to the two members, the interpivot of the two links lying radially within a line joining the two end pivots so that outward swinging movement of the links tends to move the other of said members axially away from the limited-movement member, said other member having a friction surface directly thereon to rotate and move therewith and facing outwardly away from the limited-movement member, an inwardly facing and relatively fixed friction surface arranged to be contacted by the rotating friction surface upon outward movement thereof, said fixed friction surface being arranged to limit the outward axial movement of the movable friction surface and its member to a position in which the linkage pivots bear the stated relation to each other, a thrust bearing seated against the outer surface of the axially movable member, means for adjustably setting the movement limiting means of the limited-movement member to adjustably set the axial spacing between the limited movement member and the relatively fixed friction surface so as to adjust the inter-link angle at which the rotating friction surface moves axially into contact with the fixed friction surface, and yielding means for applying a predetermined axial pressure to the thrust bearing, said yielding pressure-applying means comprising a plurality of springs and means for independently setting the pressure exerted by each of the springs, and shiftable mounting means for the several springs whereby their pressures may be selectively applied to the thrust bearing.

4. A speed control mechanism, embodying a pair of members mounted for rotation about an axis and for relative movement toward and from each other along the axis, means limiting the movement of one of said members in a direction away from the other, weighted means interconnecting the two members and adapted under the action of centrifugal force to move the other member axially away from the member whose movement is limited, friction brake means including a friction surface associated with the axially movable member for rotation and axial movement therewith and facing outwardly away from the limited-movement member, and an inwardly facing and relatively fixed friction surface arranged to be contacted by the rotating friction surface upon outward movement thereof, means for adjustably setting the axial spacing between the first mentioned one of said members and the relatively fixed friction surface, yielding means for applying a predetermined pressure to the axially movable member tending to force it and its associated friction surface toward the limited-movement member and away from the fixed friction surface, and a stop associated with the pressure applying means to prevent the application of pressure to said member in its range of movement where its friction surface is spaced from the fixed friction surface by more than a predetermined distance.

5. A speed control mechanism, embodying a pair of members mounted for rotation about an axis and for relative movement toward and from each other along the axis, means limiting the movement of one of said members axially away from the other, a weighted linkage interconnecting the two members and comprising two interpivoted links whose outer ends are pivoted respectively to the two members, the interpivot of the two links lying radially within a line joining the two end pivots so that outward swinging movement of the links tends to move the other of said members axially away from the limited-movement member, said other member having a friction surface directly thereon to rotate and move therewith and facing outwardly away from the limited-movement member, an inwardly facing and relatively fixed friction surface arranged to be contacted by the rotating friction surface upon outward movement thereof, said fixed friction surface being arranged to limit the outward axial movement of the movable friction surface and its member to a position in which the linkage pivots bear the stated relation to each other, a thrust bearing seated against the outer surface of the axially movable member, yielding means for applying a predetermined axial pressure to the thrust bearing, means for adjustably setting the movement limiting means of the limited movement member to adjustably set the axial position of that member so as to adjust the interlink angle at which the rotating friction surface moves axially into contact with the fixed friction surface, and a stop associated with the pressure applying means to prevent the application of pressure to the axially movable member through the thrust bearing in the range of movement of said member where its friction surface is spaced from the fixed friction surface by more than a predetermined distance.

6. In a speed control mechanism of the type which includes a pair of members mounted for rotation about an axis, at least one of the members being axially movable toward and from the other along the axis, weighted means acting between the two members and tending under the action of centrifugal force to move the axially movable member axially in one direction, and friction brake means including a friction surface associated with the axially movable member for rotation and axial movement therewith and a relatively fixed friction surface arranged to be contacted by the rotating friction surface by virtue of the said axial motion thereof; the improvement which comprises yielding means for applying selectively any one of a plurality of predetermined pressures to the axially movable member, tending to move it and its associated friction surface axially away from the fixed friction surface, said yielding means including a plurality of springs and movable mounting means for the several springs, said mounting means being shiftable to bring the several springs selectively into pressure transmitting relation to the axially movable member.

7. A speed control mechanism as defined in claim 6, and also including means for independently setting the pressure exerted by each of the springs.

8. In a speed control mechanism of the type which includes a pair of members mounted for rotation about an axis, at least one of the members being axially movable toward and from the other along the axis, weighted means acting between the two members and tending under the action of centrifugal force to move the axially movable member axially in one direction, and friction brake means including a friction surface associated with the axially movable member for rotation and axial movement therewith and a relatively fixed friction surface arranged to be contacted by the rotating friction surface by virtue of the said axial motion thereof; the improvement which comprises yielding means for applying selectively any one of a plurality of predetermined pressures to the axially movable member, tending to move it and its associated friction surface axially away from the fixed friction surface, said yielding means including an element axially movable along the said axis, a thrust bearing acting between the element and the axially movable member and adapted when loaded to apply axial force to the member tending to move it and its associated friction surface axially away from the fixed friction surface, a plurality of springs, and shiftable means for selectively applying force from either one or another of the several springs to the said element in a direction to load the thrust bearing.

9. In a speed control mechanism of the type which includes a pair of members mounted for rotation about an axis, at least one of the members being axially movable toward and from the other along the axis, weighted means acting between the two members and tending under the action of centrifugal force to move the axially movable member axially in one direction, and friction brake means including a friction surface associated with the axially movable member for rotation and axial movement therewith and a relatively fixed friction surface arranged to be contacted by the rotating friction surface by virtue of the said axial motion thereof; the improvement which comprises yielding means for applying selectively any one of a plurality of predetermined pressures to the axially movable member, tending to move it and its associated friction surface axially away from the fixed friction surface, said yielding means including a pivoted lever in pressure transmitting relation to the axially movable member, a plurality of springs and means for independently setting the pressure exerted by each of the springs, and shiftable mounting means for shifting the relative positions of the several springs and the lever to apply force selectively from either one or another of the springs to the lever.

10. In a speed control mechanism of the type which includes a pair of members mounted for rotation about an axis, at least one of the members being axially movable toward and from the other along the axis, weighted means acting between the two members and tending under the action of centrifugal force to move the axially movable member axially in one direction, and friction brake means including a friction surface associated with the axially movable member for rotation and axial movement therewith and a relatively fixed friction surface arranged to be contacted by the rotating friction surface by virtue of the said axial motion thereof; the improvement which comprises yielding means for applying selectively any one of a plurality of predetermined pressures to the axially movable member, tending to move it and its associated friction surface axially away from the fixed friction surface, said yielding means including an element axially movable along the said axis, a thrust bearing acting between the element and the axially movable member and adapted when loaded to apply axial force to the member tending to move it and its associated friction surface axially away from the fixed friction surface, adjustable stop means associated with the element and adapted to limit its axial motion to prevent loading of the thrust bearing when the two friction surfaces are spaced apart by more than a predetermined distance, a plurality of springs, and shiftable means for applying force selectively from the several springs to the said element in a direction to load the thrust bearing.

11. In a speed control mechanism of the type which includes a pair of members mounted for rotation about an axis, at least one of the members being axially movable toward and from the other along the axis, weighted means acting between the two members and tending under the action of centrifugal force to move the axially movable member axially in one direction, and friction brake means including a friction surface associated with the axially movable member for rotation and axial movement therewith and a relatively fixed friction surface arranged to be contacted by the rotating friction surface by virtue of the said axial motion thereof; the improvement which comprises yielding means for applying selectively any one of a plurality of predetermined pressures to the axially movable member, tending to move it and its associated friction surface axially away from the fixed friction surface, said yielding means including a lever pivoted on a pivot axis spaced from and generally normal to the first said axis, the lever being in pressure transmitting relation to the axially movable member, a spring support carrying guideways for a plurality of springs, springs in the guideways, the spring support and its carried springs being bodily shiftable with respect to the lever to bring the several springs selectively into pressure transmitting relation with the lever, and means for independently setting the pressure exerted by each of the springs on the lever.

12. A speed control mechanism as defined in claim 11, and in which the means for setting the pressure of each spring is operable only when that spring is in the said pressure transmitting relation to the lever.

13. In a speed control mechanism of the type which includes a pair of members mounted for rotation about an axis, at least one of the members being axially movable toward and from the other along the axis, weighted means acting between the two members and tending under the action of centrifugal force to move the axially movable member axially in one direction, and friction brake means including a friction surface associated with the axially movable member for rotation and axial movement therewith and a relatively fixed friction surface arranged to be contacted by the rotating friction surface by virtue of the said axial motion thereof; the improvement which comprises yielding means for applying selectively any one of a plurality of predetermined pressures to the axially movable member, tending to move it and its associated friction surface axially away from the fixed friction surface, said yielding means including a pivoted lever in pressure transmitting relation to the axially movable member, a spring support carrying a plurality of axially movable pins, movable abutments arranged in opposition to the respective pins, springs interposed between the respective abutments and the pins, and means for independently moving each abutment to vary the pressure exerted by the associated spring against its pin, the spring support being bodily shiftable with respect to the lever to bring the several pins selectively into pressure transmitting relation with the lever.

14. A speed control mechanism as defined in claim 13, and also including stop means associated with the pins and limiting their axial movement in the direction of spring pressure, and means associated with the lever and acting by virtue of the movement of a pin into pressure transmitting relation therewith to shift the pin axially away from the said stop means.

15. In a speed control mechanism of the type which includes a pair of members mounted for rotation about an axis, at least one of the members being axially movable toward and from the other along the axis, weighted means acting between the two members and tending under the action of centrifugal force to move the axially movable member axially in one direction, and friction brake means including a friction surface associated with the axially movable member for rotation and axial movement therewith and a relatively fixed friction surface arranged to be contacted by the rotating friction surface by virtue of the said axial motion thereof; the improvement which comprises yielding means for applying selectively any one of a plurality of predetermined pressures to the axially movable member, tending to move it and its associated friction surface axially away from the fixed friction surface, said yielding means including a pivoted lever in pressure transmitting relation to the axially movable member, a spring carrier rotatable about a carrier axis, a plurality of bores in the carrier, arranged circularly about the carrier axis, and having axially movable pins extending from one end thereof and abutments threadedly received in their opposite ends, springs interposed between the pins and abutments in the respective bores, the spring carrier being rotatably shiftable to bring the several bores selectively into operating position with their associated pins in pressure transmitting relation to the lever.

16. A speed control mechanism as defined in claim 15 and also including an apertured cover member so positioned with respect to the rotatable spring carrier that its aperture registers with the said opposite end of each bore only when the latter is in operating position, thereby providing access for setting the threaded position of the associated abutment.

HENRY N. FAIRBANKS.
VICTOR H. EISLER.

REFERENCES CITED

The following references are of record in the file of this patent:

UNITED STATES PATENTS

| Number | Name | Date |
|---|---|---|
| 558,844 | Robinson | Apr. 21, 1896 |
| 1,284,184 | Dun Lany | Nov. 5, 1918 |
| 1,378,206 | Wilson | May 17, 1921 |
| 1,481,933 | Stowe | Jan. 29, 1924 |
| 1,556,454 | Molyneux | Oct. 6, 1925 |